United States Patent [19]

Addink

[11] Patent Number: 6,042,477
[45] Date of Patent: Mar. 28, 2000

[54] METHOD OF AND SYSTEM FOR MINIMIZING THE EFFECTS OF TIME LATENCY IN MULTIPLAYER ELECTRONIC GAMES PLAYED ON INTERCONNECTED COMPUTERS

[76] Inventor: Dale H. Addink, 1701 W. Northwest Hwy. Suite 220, Grapevine, Tex. 76051

[21] Appl. No.: 08/764,127

[22] Filed: Dec. 12, 1996

[51] Int. Cl.[7] .................................................... G06F 1/12
[52] U.S. Cl. ............................................. 463/42; 395/553
[58] Field of Search .............................. 395/200.78, 552, 395/553; 463/40, 41, 42

[56] References Cited

U.S. PATENT DOCUMENTS

| | | | |
|---|---|---|---|
| 5,185,603 | 2/1993 | Medin | 345/213 |
| 5,350,176 | 9/1994 | Hochstein et al. | 463/42 |
| 5,618,045 | 4/1997 | Kagan et al. | 463/40 |
| 5,685,775 | 11/1997 | Bakoglu et al. | 463/41 |
| 5,751,721 | 5/1998 | Bloks | 395/200.78 |
| 5,775,996 | 7/1998 | Othmer et al. | 463/40 |
| 5,805,871 | 9/1998 | Baxter | 395/200.78 |

*Primary Examiner*—Valencia Martin-Wallace
*Assistant Examiner*—John Paradiso
*Attorney, Agent, or Firm*—Myers, Bigel, Sibley & Sajovec, P.A.

[57] ABSTRACT

A method of minimizing the effects of time latency in multiplayer electronic games played over a network including a plurality of computers. Each computer is associated with a game object and each computer includes an internal clock. Each computer periodically transmits a packet containing a packet time and time dependent attribute information for its associated game object. The receiving computer uses the packet time to render the game object in the game environment based on the time the packet was sent.

23 Claims, 4 Drawing Sheets

Fig. 4

METHOD OF AND SYSTEM FOR MINIMIZING THE EFFECTS OF TIME LATENCY IN MULTIPLAYER ELECTRONIC GAMES PLAYED ON INTERCONNECTED COMPUTERS

FIELD OF THE INVENTION

The present invention relates generally to electronic games and more particularly to interactive multiplayer electronic games played in real time on interconnected computers, such as computers in networks such as the Internet.

DESCRIPTION OF THE PRIOR ART

Over the past twenty years, computer games have grown tremendously in popularity and sophistication. From their beginnings with games such as "Pong" and "Tank" that had crude two-color graphics, minimal sound effects, and simple scenarios, computer games now have 256 (or higher) color high resolution graphics, stereo sound effects, and realistic scenarios.

Most computer games are standalone, in that they reside on a single arcade machine, home game machine, or personal computer. Standalone games are usually adapted for use by a single user. In combat games, the user competes with computer controlled opponents. Single-user combat games can be challenging, but over time the user can learn the rules by which the computer controlled opponents operate and thereby defeat the opponent with ease.

Some standalone games are available in multiple-user versions so that two or more players can compete with each other. Multiple-user games offer players the challenge of being able to play against a human opponent. Although some computer controlled opponents have very sophisticated programming, humans can react to game situations in less predictable ways than the typical computer generated opponent. Also, a human player can adapt to the playing style of his opponent and thereby increase the interest in the game over time. However, people usually have only limited number of opponents available for play and they may exhaust their supply of opponents or grow tired of playing with those they have.

The Internet and other large networks have opened up new possibilities for communication. The industrialized world is now connected with telephone systems and computer networks such that people almost anywhere can pass data to each other. People have recognized that the Internet may provide a platform for the play of multiplayer electronic games.

One problem with using the Internet as a platform for highly interactive real time electronic games lies in the nature of the Internet itself. Internet connections are established tpically through telephone lines. After a connection is established, data packets are passed serially through hardware such as routers and the like. Since packets can go through routers only one at a time, routers include buffers to hold packets while the router is busy. At times, packets arrive when the router is free and go straight through. However, at other times, packets arrive when the router is busy and have to wait in the buffer. Accordingly, during any connection the transit time for packets usually is not constant.

The variable latency for transmissions is not normally a serious problem in most forms of data communication. For example, it does not normally matter whether one packet of character data takes 50 milliseconds longer to arrive at its destination than the next. Thus, in turn-based multiplayer games, such as chess or bridge, variable latency for transmission of move or play information among the players does not adversely affect game play.

However, variable latency is a serious problem for real time, fast paced, highly interactive, games, such as combat simulation games or vehicle race games, in which the players operate substantially independently and are not constrained to wait their turn. In such games, each computer is associated with a game object and each computer sends out packets periodically to the other computers involved in the game. The packets contain information about the game object, including time dependent attributes such as where the game object is located and its velocity and acceleration in the virtual space of the game at the time the packet is sent.

Each computer sends packets at a fairly predictable rate, but due to the nature of transmission over the Internet, the packets do not arrive at a predictable rate. Since the packets do not arrive at a uniform rate, the receiving computer cannot reliably use the time of arrival to apply the time dependent attributes to the game objects.

In combat simulation games, the targets typically travel through the virtual space of the game at high speeds. Variable latency leads to uncertainty in where a particular target is located at a particular time. Such uncertainty decreases the realism of the play and leads to frustration of the players. Presently, there is no satisfactory solution for compensating for the effects of variable latency in real time.

High latency also leads to uncertainty with regard to the position of game objects. On a high-latency network, a significant period of time can elapse betwen the time a player game object an data indicating that movement is received by other players. Uncertainty as to the position of the game object increases as latency increases. At present, satisfactory game play cannot be had for real-time games over a high latency network.

It is therefore an object of the present invention to overcome the shortcomings of the prior art. It is a further object of the present invention to provide a method of minimizing the effects of time latency in multiplayer electronic games played in real time on interconnected computers, such as over large networks like the Internet.

SUMMARY OF THE INVENTION

Briefly stated, the foregoing and other objects are accomplished by the present invention, which provides a method of and system for minimizing the effects of varying or high time latency in the receipt of update information for game objects in multiplayer electronic games played on interconnected computers by updating the time dependent status of game objects based when the information was sent, rather than when the information was received.

Each computer runs game code that manages the environment or virtual space in which the game is played. Each computer is associated with a game object and each computer periodically sends to other computers of the network a packet that includes a packet time, which is equal to the time value of the internal clock of the sending computer when said packet was sent. Each packet also includes time dependent attribute information at the packet time for the game object associated with the sending computer. Each computer processes the packets it receives and renders the game object associated with each packet received in the game environment. The receiving computer renders the game object by applying the time dependent attribute information based on the time the packet was sent.

When a computer receives a packet for a new game object, the receiving computer computes the difference between the packet time of the packet and the time value of its own internal clock to establish a base clock offset for packets from the new game object. The receiving computer processes the packet to render the game object in the game environment according to the time dependent attribute information in the packet. For example, in a game where the game objects represent targets, the time dependent attribute information includes position and motion information. Therefore, the receiving computer processes the packet to position and move the target in the virtual space of the game.

When the receiving computer receives a second packet from the sending computer, the receiving computer computes the difference between the packet time of the second packet and the time value of its internal clock to establish a new clock offset. The receiving computer then compares the new clock offset with the base clock offset and adjusts the base clock offset whenever the base clock offset and the new clock offset are different from each other. The receiving computer also adds the base offset to the packet time to arrive at a time value that reflects the time the packet was sent, but in a time frame of reference that is meaningful to the receiving computer.

The receiving computer adjusts the base clock offset by adding an incremental value to said base clock offset whenever the new clock offset is greater than the base clock offset and subtracting an incremental value whenever the new clock offset is less than the base clock offset. Preferably, the incremental value is a fixed, relatively small, time increment so as to adjust the base clock offset smoothly. The system adds the base clock offset to the packet time and then processes the position and motion information in each packet to correct the position and movement of the target in the virtual space of the game. occasionally, the base clock offset will be substantially different from most of the new clock offsets, which indicates that the base offset is based on an anomalous packet arrival latency. By adjusting the base clock offset in small increments, it could require several iterations to bring the base clock offset within the neighborhood of the average packet transmission time. Accordingly, in one of its aspects, the present invention sets the base clock offset equal to the last received new clock offset whenever the absolute value of the difference between the base clock offset and the new clock offsets is greater than a predetermined threshold over the receipt of a predetermined number of packets for a particular target.

The base clock offset, in effect, interlocks the internal clocks of the sending and receiving computers. Since the receiving computer dynamically updates the base offset in a controlled manner, varying time latency effects are smoothed over the course of time.

DESCRIPTION OF THE PREFERRED EMBODIMENT

Figure 1:
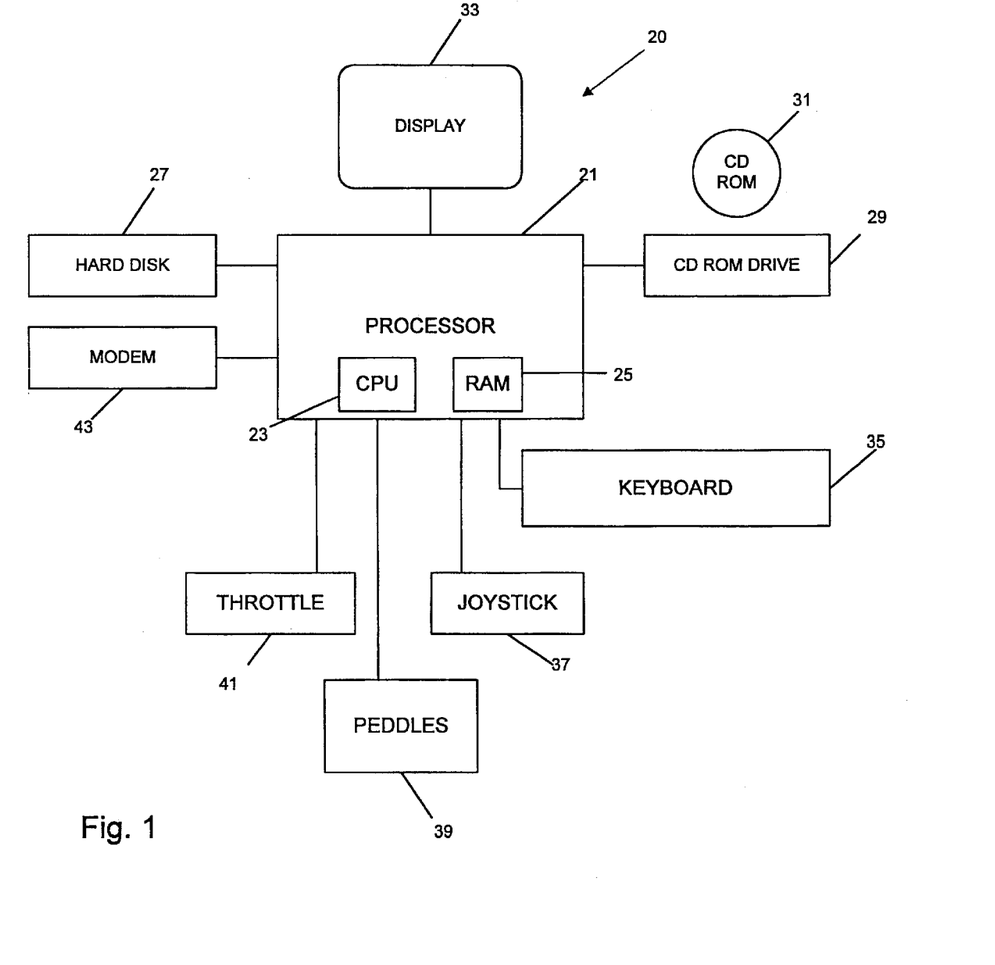
FIG. 1 is a block diagram of a personal computer adapted for practicing the present invention.

Referring now to FIG. 1, a hardware block diagram of a personal computer system with which the system and method of the present invention may be implemented is designated generally by the numeral 20. System 20 includes processor 21, which includes a central processing unit 23 and random access memory 25. System 20 also includes additional memory in the form of a hard disk storage device 27 and a CD-ROM device 29. CD-ROM device 29 is adapted to receive a CD-ROM 31 on which may be recorded software for programs, including a software implementation of the present invention. System 20 also includes user interface hardware devices including a display 33 and a keyboard 35. Since preferred embodiment of the present invention is adapted for use in an aerial combat flight simulation game, the user interface hardware devices preferably include a joystick 37, rudder peddles 39, and a throttle 41. System 20 also includes a modem 43 for connecting system 20 to networks, such as the Internet.

Figure 2:
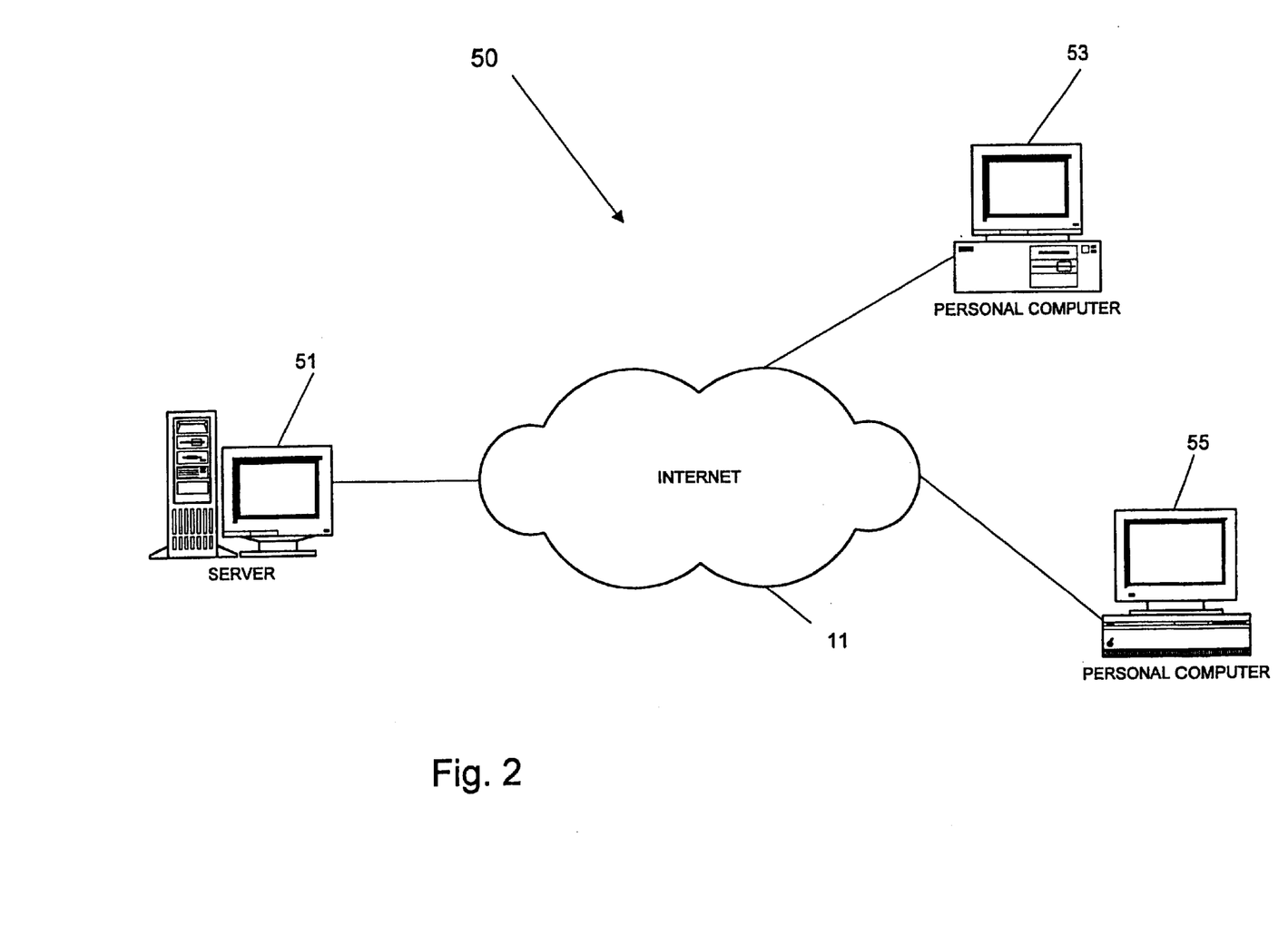
FIG. 2 is a simplified diagram of a system according to the present invention.

Referring now to FIG. 2, there is shown a simplified diagram of a system 50 according to the present invention. System 50 includes a server machine 51 and a plurality of personal computers, including a first PC 53 and a second PC 55. Server machine 51 and PCs 53 and 55 have TCP/IP connections to a network, such as the Internet 11, and are thus in communication with each other.

As is known to those skilled in the art, the Internet generally has a three-tiered structure. The highest tier of the structure is a backbone that holds the entire Internet together. The backbone is made up of large networks, such as NSFNET and EBONE. The next tier below the backbone includes a plurality of mid-level networks that carry data and do routing for lower-level networks and for their own hosts. Examples of mid-level networks are NEARNET, PSINET, and SURANET. The lowest tier of the Internet includes a plurality of stub networks, which are basically local or metropolitan area networks. The stub networks include personal computers and servers of the type used in practicing the present invention.

In the preferred embodiment of the present invention, the game is an aerial combat flight simulation in which each personal computer, including PCs 53 and 55, has running thereon game code with which a player can control an airplane operating in a virtual space. The game code translates joystick, throttle, and peddle signals into simulated flight. The joystick also has controls that allow the user to deploy weapons against targets in the virtual space.

An airplane on one computer of system 50 represents a target on other computers of system 50. Thus, the airplane controlled by PC 53 is a target on PC 55. Likewise, the airplane controlled by PC 55 is a target on PC 53. The game code running on each PC transmits target information packets periodically. The packets identify the sending airplane and provide at least position and motion information about the airplane at the time the packet is sent.

The position information is the location (x,y,z) of the airplane in the virtual space. The motion information includes at least a velocity vector $(v_x, v_y, v_z)$ and an acceleration vector $(a_x, a_y, a_z)$. The packet also includes a packet time, which is the sending computer's internal clock value at the time the packet is sent. The internal clock value is obtained through an operating system API and it is in an hour-minute-millisecond format. In the preferred embodiment of the invention each computer sends a packet every 500 milliseconds. The game code on each computer processes the packets received from other computers and uses the position and motion information to locate the targets in and move them through the virtual space.

Server machine 51 performs game system administration and packet passing among the computers in the system.

Server machine 51 manages the virtual space. Since each computer sends two packets of finite length per second and literally hundreds of computers can be logged on to the system at any particular time, a personal computer might not be able to receive in real time a packet from each of the other computers. Therefore, server machine 51 sends each computer packets for only a manageable number of targets. In the preferred embodiment, server machine 51 sends each computer in the system packets for the thirty nearest targets.

Each computer sends packets at a fairly predictable rate, which is nominally once each 500 milliseconds. There may be some variation in the rate at which a computer sends a packet as the computer performs other tasks. However, a more serious cause for packets not to arrive at the their destinations at a uniform predictable rate is due to the nature of transmission over the Internet. In the Internet environment, using the arrival time of the packet as a basis to apply position and motion information to a target is not acceptable in games in which targets move through the virtual space at high speeds. For example, in a World War II aerial flight simulation game, the targets are capable of travelling in excess of 300 miles per hour (440 feet per second). Therefore, an uncertainty in time of 100 milliseconds translates into an uncertainty in space of 44 feet.

A better basis for positioning targets in the virtual space is the time at which the packet was sent. However, while internal clocks of computers are very accurate in terms of measuring elapsed time, the indicated time on any particular computer is probably not correct in the absolute sense. Moreover, computer internal clocks are not synchronized with each other. Finally, since the computers of the system may be in many different time zones, the packet time is fairly useless to the receiving computer as an indicator of when the packet was actually sent. For example, a packet time of 23:04:20.007 for a packet sent from a computer in New York would not be useful if it were received in California at the receiving computer's clock time of 20:02:50.798. Even ignoring the hour value does not help, due to the mis-synchronization of the two clocks.

Figure 3:
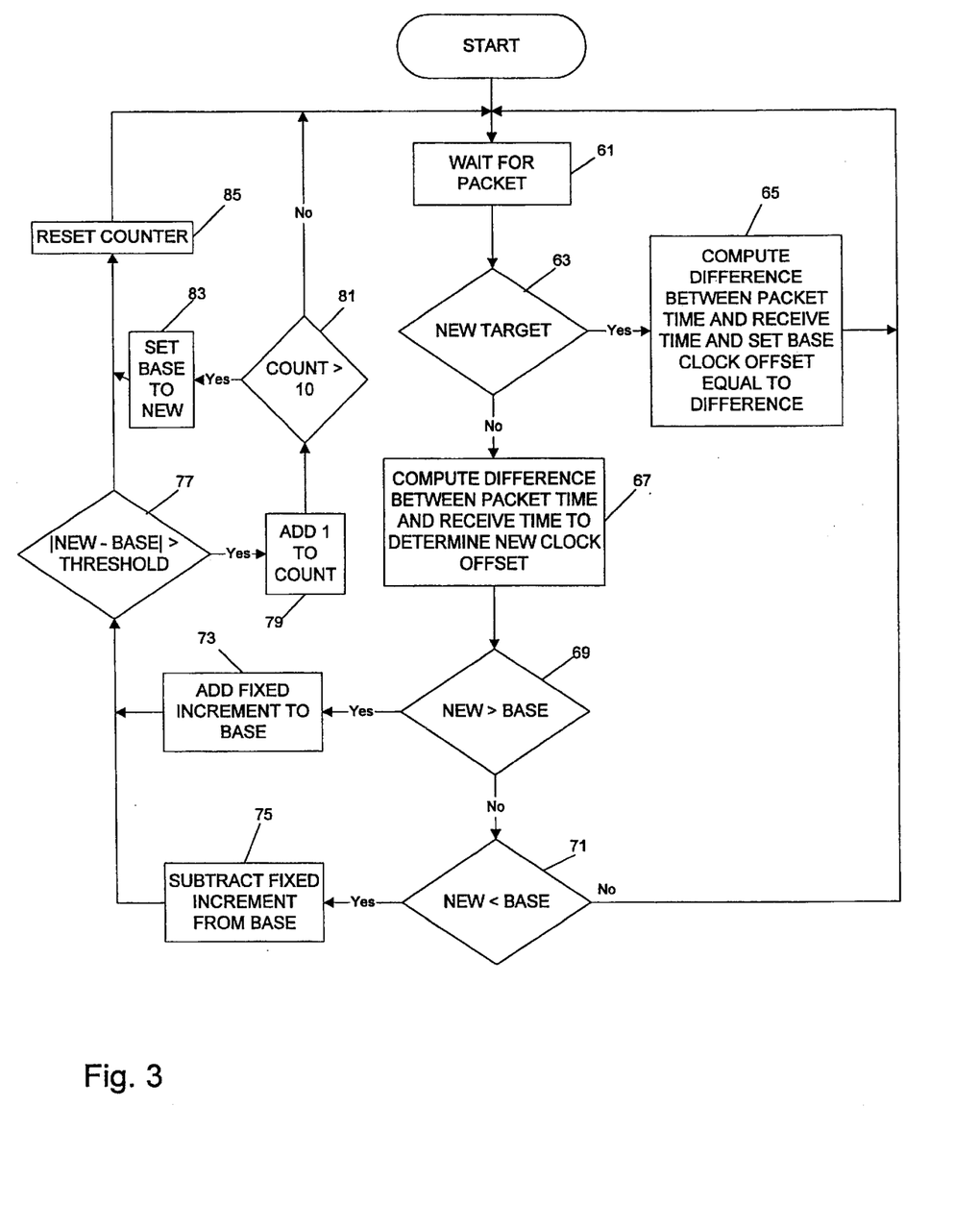
FIG. 3 is a flowchart illustrating the logic of a preferred software implementation of the method of determining and adjusting the base clock offset according to the present invention.

In the present invention, the clocks of the sending and receiving computers are dynamically interlocked according to the logic of the flowchart of FIG. 3. Referring to FIG. 3, after initialization, the receiving computer waits for a packet at block 61. When the computer receives a packet, it tests at decision block 63 whether or not the packet is from a new target. If the target is new, the receiving computer computes at block 65 the difference between the packet time and time the packet was received and sets a base clock offset for the target equal to that difference. While the time indicated by a computer's internal clock may be wrong in an absolute sense, computer clocks are very accurate from second to second. Thus, in the absence of varying latency of transmission time from one computer to another, the base clock offset should be constant. After the receiving computer has computed the base clock offset at block 65, the receiving computer returns to block 61 to wait for the next packet.

If, at decision block 63, the target is not new, the receiving computer computes the difference between the packet time and the time the packet was received, at block 67. The difference computed at block 67 is a new clock offset. The receiving computer then compares the new offset to the base offset. At decision block 69 the receiving computer tests whether or not the new offset is greater than the base offset. If not, the receiving computer tests at decision block 71 whether the new clock offset is less than the base clock offset. If not, the base and new clock offset are equal to each other and the receiving computer returns to await another packet at block 61.

If the new clock offset is different from the base clock offset, the receiving computer adjusts the base offset. Specifically, if the new offset is greater than the base clock offset, at decision block 69, the receiving computer adds a fixed increment to the base clock offset at block 73. If the new offset is less than the base clock offset, at decision block 71, the receiving computer subtracts a fixed increment to the base clock offset at block 75.

In the preferred embodiment, the increment by which the base clock offset is adjusted is 2 milliseconds. The increment is chosen to have a low value so that the base does not vary widely from packet to packet. The small incremental adjustment adds to the stability and smoothness of the movement of the target through the virtual space. It will be recognized that the over several iterations, the base clock offset will tend toward a stable value based on the average transmission time of packets form the sending computer to the receiving computer.

Occasionally a base clock offset may be based on an anomalous packet. For example, the first packet received for a target may have been held in buffers along the way for a few hundred milliseconds. In such case, the new clock offsets would generally be much less than the base clock offset. At two packets per second, it could take a minute to adjust such an anomalous base offset.

Therefore, the receiving computer tests at decision block 77 whether the absolute value of the difference between the base clock offset and the new clock offset is greater than a predetermined threshold value, which in the preferred embodiment is 500 milliseconds. If so, the receiving computer adds one to a counter at block 79 and tests at decision block 81 whether the count is greater than a predetermined number, which in the preferred embodiment is ten. If the count is greater than ten, then the receiving computer sets the base clock offset equal to the new clock offset at block 83 and resets the counter at block 85. Thus, when the base and new clock offsets remain substantially different from each other over several consecutive cycles, the receiving computer determines that the base is wrong and starts over with a new base. If, at decision block 77, the absolute value of the difference between the new clock offset and the base clock offset is not greater than the threshold, the receiving computer resets the counter at block 85 and returns to block 61 to wait for the next packet.

Figure 4:
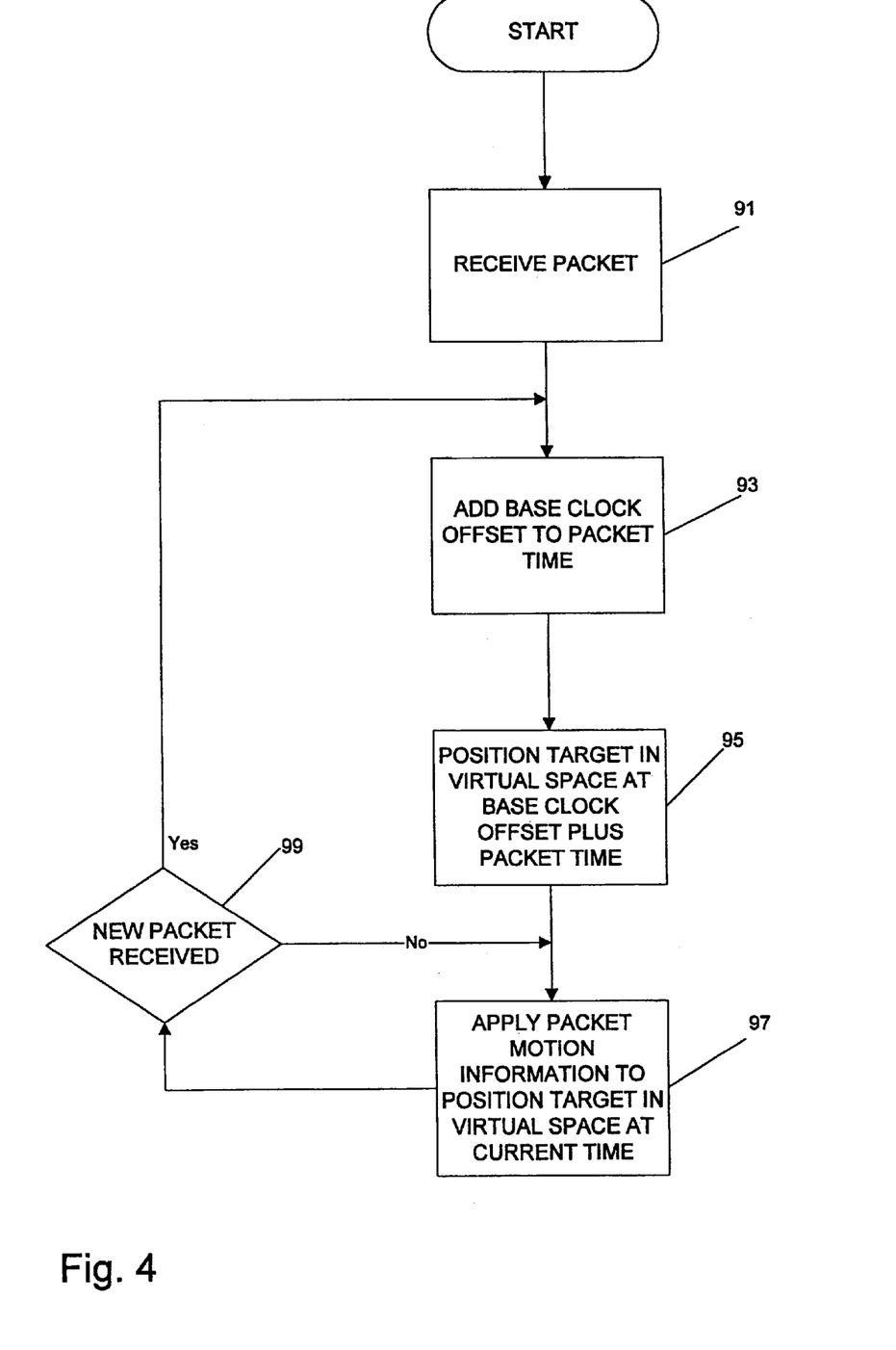
FIG. 4 is a flowchart illustrating the logic of a preferred software implementation of the method of positioning game objects according to the present invention.

The receiving computer uses the base clock offset to position and move the targets through the virtual space of the game based on when the packets were sent rather than when they were received. Referring to FIG. 4, the receiving computer receives packets at block 91. Each time the receiving computer receives a packet, the receiving computer adds the base clock offset to the packet time at block 93. The time value sum obtained at block 93 is an indication of when the packet was sent, but it is in the receiving computer's time frame of reference.

The receiving computer then uses the time value obtained at block 93 to position the target in the virtual space, at block 95. For example, if the position vector for the target in packet "n" is $(x_n, y_n, z_n)$, the receiving computer positions the target in its virtual space at $(x_n, y_n, z_n)$ at a time equal to the packet time plus the base clock offset. Then, the receiving computer applies the motion information of the packet to project the target forward in time and space to position the target in the virtual space at the receiving computer's current time, at block 97. The motion information includes at least a velocity vector $(v_{xn}, v_{yn}, v_{zn})$ and an acceleration vector $(a_{xn}, a_{yn}, a_{zn})$. By application of the laws of mechanics, the receiving computer can compute the position of the target in the virtual space for all time.

After the receiving computer has positioned the target in the virtual space at the current time, the receiving computer tests, at decision block 99, whether a new packet has been received for the target. If not, the receiving computer goes back to block 97 and applies the motion information to position the target in the virtual space at the current time. Thus, the receiving computer advances the target in real time according to the motion information of the last packet it has received for the target. If, at decision block 99, a new packet is received for the target, the receiving computer returns to block 93 to begin processing the new packet.

The receiving computer uses the base clock offset routine of FIG. 3 and the positioning routine of FIG. 4 to move each target in the virtual space of the game. The positioning routine steps each target through the virtual space in real time according to the information in the most recent packet it has received. As new packets are received, the position for the target is updated, if necessary.

The receiving computer thus positions all targets in the virtual space. The receiving computer displays the targets according to such factors as the current field of view of the airplane of the receiving computer and the distance from the airplane of the receiving computer to the targets in its field of view, in a manner known to those skilled in the art.

From the foregoing it may be seen that the present invention is well adapted to overcome the shortcomings of the prior art with respect to high or varying time latency in the receipt of information in multiplayer electronic games. As packets are received, the receiving computer adjusts the base clock offset and uses the adjusted base clock offset to correct the position of the target.

Although the present invention has been shown and described with reference to a preferred embodiment, those skilled in the art will recognize that various alternatives and modifications thereof are within the spirit and scope of the invention. For example, while the preferred embodiment of the invention has application to an aerial combat flight simulation game, those skilled in the art will recognize that the invention has application to any multiplayer electronic game in which high or variable time latency in the receipt of information on the game objects is a problem. Accordingly, the foregoing description is for purposes of illustration and not limitation. The spirit and scope of the invention is set forth in the appended claims.

What is claimed is:

1. A method of rendering an object in a multiplayer electronic game virtual space such that time latency effects are reduced, wherein the object is controlled by a first one of a plurality of user computers in communication with each other across a communications network, wherein each user computer executes a game loop that renders objects within the virtual space, and wherein game loop execution on the plurality of user computers is asynchronous, the method comprising the steps of:

receiving at a second user computer a data packet from the first user computer via the communications network, wherein the data packet comprises:
   a packet time that is based on a time when the data packet was transmitted from the first user computer; and
   information for rendering the object within the virtual space;
interrupting asynchronous game loop execution at the second user computer to associate a time relative to an internal clock of the second user computer with the received data packet; and
resuming asynchronous game loop execution to render the object on the second user computer in the virtual space with time dependent attributes that correspond to a current time during each game loop.

2. A method according to claim 1 wherein the information for rendering the object within the virtual space comprises at least one of position information for the object within the virtual space at the packet time and motion information for the object within the virtual space at the packet time.

3. A method according to claim 2 wherein the step of resuming asynchronous game loop execution to render the object comprises rendering the object within the virtual space with at least one of the position information for the object within the virtual space at the packet time and the motion information for the object within the virtual space at the packet time.

4. A method according to claim 1 further comprising the following steps which precede the step of receiving a data packet from the first user computer:

transmitting the data packet from the first user computer to a server computer via the communications network; and
transmitting the data packet from the server computer to selected ones of the plurality of user computers identified by the server computer via the communications network.

5. A method of rendering an object in a multiplayer electronic game virtual space such that time latency effects are reduced, wherein the object is controlled by a first one of a plurality of user computers in communication with each other across a communications network, wherein each user computer executes a game loop that renders objects within the virtual space, and wherein game loop execution on the plurality of user computers is asynchronous, the method comprising the steps of:

receiving at a second user computer a data packet from the first user computer via the communications network, wherein the data packet comprises:
   an identifier of the object;
   a packet time that is based on a time when the data packet was transmitted from the first user computer; and
   position information for the object within the virtual space at the packet time;
interrupting asynchronous game loop execution at the second user computer;
adding a base clock offset value to the packet time of the received data packet, wherein the base clock offset value corresponds to differences between the packet time and received time of data packets received previously by the second user computer; and
resuming asynchronous game loop execution on the second user computer to render the object in the virtual space at a position that corresponds to a current time during each game loop.

6. A method according to claim 5 further comprising the following steps which precede the step of receiving a data packet from the first user computer:

transmitting the data packet from the first user computer to a server computer via the communications network; and
transmitting the data packet from the server computer to selected ones of the plurality of user computers identified by the server computer via the communications network.

7. A method according to claim 5 wherein the data packet also comprises motion information for the object within the virtual space at the packet time.

8. A method according to claim 7 wherein the step of resuming asynchronous game loop execution to render the object in the virtual space further comprises advancing the object through the virtual space according to the data packet motion information at a current time during each game loop.

9. A method according to claim 5 wherein an initial value of the base clock offset corresponds to a difference between the packet time and a time the data packet was received by the second user computer.

10. A method according to claim 5 wherein the base clock offset value is determined by the following steps that are executed by the second computer:
   determining a new clock offset value, wherein the new clock offset value corresponds to a difference between the packet time and a time the data packet was received by the second user computer;
   making a predetermined incremental adjustment to the base clock offset value if the new clock offset value does not equal the base clock offset value; and
   setting the base clock offset value equal to the new clock offset value if a predetermined count is exceeded by a number of consecutive occasions on which the new clock offset value and base clock offset value differ by more than a predetermined threshold amount.

11. A method according to claim 10 wherein the step of adjusting the base clock offset value by a predetermined amount comprises the steps of:
   adding a predetermined value to the base clock offset value if the new clock offset value is greater than the base clock offset value; and
   subtracting a predetermined value from the base clock offset value if the new clock offset value is less than the base clock offset value.

12. A method of rendering an object in a multiplayer electronic game virtual space such that time latency effects are reduced, wherein the object is controlled by a first one of a plurality of user computers in communication with each other across a communications network, wherein each user computer executes a game loop that renders objects within the virtual space, and wherein game loop execution on the plurality of user computers is asynchronous, the method comprising the steps of:
   transmitting a data packet from the first user computer to a server computer via the communications network, wherein the data packet comprises:
      an identifier of the object;
      a packet time that is based on an internal clock value of the first user computer at a time when the data packet was transmitted; and
      position information for the object within the virtual space at the packet time;
   transmitting the data packet from the server computer to selected ones of the plurality of user computers identified by the server computer via the communications network;
   receiving at a second user computer the data packet from the server computer via the communications network;
   interrupting asynchronous game loop execution at the second user computer;
   adding a base clock offset value to the packet time of the received data packet, wherein the base clock offset value corresponds to differences between the packet time and received time of data packets received previously by the second user computer, wherein the base clock offset value is determined by the following steps that are executed by the second computer:
   determining a new clock offset value, wherein the new clock offset value corresponds to a difference between the packet time and a time the data packet was received by the second user computer;
   making a predetermined incremental adjustment to the base clock offset value if the new clock offset value does not equal the base clock offset value; and
   setting the base clock offset value equal to the new clock offset value if a predetermined count is exceeded by a number of consecutive occasions on which the new clock offset value and base clock offset value differ by more than a predetermined threshold amount; and
   resuming asynchronous game loop execution on the second user computer to render the object in the virtual space at a position that corresponds to a current time during each game loop.

13. A method according to claim 12 wherein the data packet also comprises motion information for the object within the virtual space at the packet time.

14. A method according to claim 13 wherein the step of resuming asynchronous game loop execution to render the object in the virtual space further comprises advancing the object through the virtual space according to the data packet motion information at a current time during each game loop.

15. A method according to claim 12 wherein an initial value of the base clock offset corresponds to a difference between the packet time and a time the data packet was received by the second user computer.

16. A method according to claim 12 wherein the step of adjusting the base clock offset value by a predetermined amount comprises the steps of:
   adding a predetermined value to the base clock offset value if the new clock offset value is greater than the base clock offset value; and
   subtracting a predetermined value from the base clock offset value if the new clock offset value is less than the base clock offset value.

17. A multi-player electronic game system, comprising:
   a plurality of user computers in communication with each other via a communications network, wherein each user computer comprises:
      means for executing a game loop that renders objects from other user computers within a virtual space, wherein game loop execution on the plurality of user computers is asynchronous;
      means for controlling a respective game object;
      means for transmitting a data packet associated with each game object controlled by the user computer to other user computers, wherein each data packet comprises:
         an identifier of a respective object controlled by the user computer;
         a packet time that is based on an internal clock value of the user computer transmitting the data packet at a time when the data packet was transmitted; and
         position information for the respective object within the virtual space at the packet time;
      means for receiving a data packet from other user computers;
      means for interrupting asynchronous game loop execution in response to receiving a data packet from another user computer;

means for adding a base clock offset value to the packet time of the received data packet, wherein the base clock offset value corresponds to differences between the packet time and received time of data packets received previously by the user computer; and means for resuming asynchronous game loop execution to render an object associated with the received data packet in the virtual space at a position that corresponds to a current time during each game loop.

18. A system according to claim 17 further comprising:

a server computer in communication with each of the user computers via the communications network, wherein the server comprises:

means for receiving data packets from each of the user computers; and means for transmitting data packets to selected ones of the plurality of user computers via the communications network.

19. A system according to claim 17 wherein each data packet also comprises motion information for a respective object within the virtual space at the packet time.

20. A system according to claim 19 wherein the means for resuming asynchronous game loop execution to render an object in the virtual space further comprises means for advancing the object through the virtual space according to the data packet motion information at a current time during each game loop.

21. A system according to claim 17 wherein an initial value of the base clock offset corresponds to a difference between the packet time and a time the data packet was received by a user computer.

22. A system according to claim 17 wherein each user computer comprises means for determining a base clock offset value, comprising:

means for determining a new clock offset value, wherein the new clock offset value corresponds to a difference between the packet time and a time the data packet was received by the user computer;

means for making a predetermined incremental adjustment to the base clock offset value if the new clock offset value does not equal the base clock offset value; and means for setting the base clock offset value equal to the new clock offset value if a predetermined count is exceeded by a number of consecutive occasions on which the new clock offset value and base clock offset value differ by more than a predetermined threshold amount.

23. A system according to claim 22 wherein the means for adjusting the base clock offset value by a predetermined amount comprises:

means for adding a predetermined value to the base clock offset value if the new clock offset value is greater than the base clock offset value; and means for subtracting a predetermined value from the base clock offset value if the new clock offset value is less than the base clock offset value.

* * * * *